United States Patent
Ahmad

(10) Patent No.: US 11,665,730 B2
(45) Date of Patent: May 30, 2023

(54) RELAY FOR WIRELESS COMMUNICATION SYSTEM

(71) Applicant: InterDigital Patent Holdings, Inc., Wilmington, DE (US)

(72) Inventor: Saad Ahmad, Montreal (CA)

(73) Assignee: InterDigital Patent Holdings, Inc., Wilmington, DE (US)

(*) Notice: Subject to any disclaimer, the term of this patent is extended or adjusted under 35 U.S.C. 154(b) by 0 days.

(21) Appl. No.: 16/475,760

(22) PCT Filed: Jan. 9, 2018

(86) PCT No.: PCT/US2018/013002
§ 371 (c)(1),
(2) Date: Jul. 3, 2019

(87) PCT Pub. No.: WO2018/129543
PCT Pub. Date: Jul. 12, 2018

(65) Prior Publication Data
US 2019/0349951 A1    Nov. 14, 2019

Related U.S. Application Data

(60) Provisional application No. 62/501,456, filed on May 4, 2017, provisional application No. 62/444,029, filed on Jan. 9, 2017.

(51) Int. Cl.
*H04W 72/08* (2009.01)
*H04W 72/10* (2009.01)
(Continued)

(52) U.S. Cl.
CPC ......... *H04W 72/543* (2023.01); *H04W 8/005* (2013.01); *H04W 72/56* (2023.01);
(Continued)

(58) Field of Classification Search
CPC ... H04W 72/087; H04W 72/10; H04W 88/04; H04W 76/18; H04W 8/005; H04W 76/30
(Continued)

(56) References Cited

U.S. PATENT DOCUMENTS 8,576,714 B2    11/2013    Yang et al.
10,531,365 B2 *  1/2020    Kaur ............... H04W 24/04
(Continued)

FOREIGN PATENT DOCUMENTS

CN    101998495 A    3/2011
CN    101998520 A    3/2011
(Continued)

OTHER PUBLICATIONS

3rd Generation Partnership Project (3GPP), RP-151109, "New SI Proposal: Feasibility Study on LTE-Based V2X Services", LG Electronics, CATT, Vodafone, Huawei, TSG RAN Meeting #68, Malmö, Sweden, Jun. 15-18, 2015, 7 pages.
(Continued)

*Primary Examiner* — Faisal Choudhury
(74) *Attorney, Agent, or Firm* — Flaster Greenberg, P.C.

(57) ABSTRACT

Systems, methods and instrumentalities are disclosed for establishing a connection between a remote WTRU and a relay WTRU over a radio link interface. The relay WTRU may be authorized by a network to perform relay functions and may receive a parameter relating to the operation of the radio link interface. The relay WTRU may receive a request from the remote WTRU to establish a connection with relay WTRU over the radio link interface. The relay WTRU may determine whether to accept or reject the request based on information provided by the remote WTRU and the network. The relay WTRU may send a response to the remote WTRU based on the determination.

18 Claims, 8 Drawing Sheets

(51) Int. Cl.
*H04W 72/543* (2023.01)
*H04W 76/18* (2018.01)
*H04W 76/30* (2018.01)
*H04W 8/00* (2009.01)
*H04W 72/56* (2023.01)
*H04W 88/04* (2009.01)

(52) U.S. Cl.
CPC .......... *H04W 76/18* (2018.02); *H04W 76/30* (2018.02); *H04W 88/04* (2013.01)

(58) Field of Classification Search
USPC .......................................................... 370/329
See application file for complete search history.

(56) References Cited

U.S. PATENT DOCUMENTS

| | | | | |
|---|---|---|---|---|
| 2010/0002582 | A1* | 1/2010 | Luft ................. | H04W 74/0866 455/574 |
| 2015/0229970 | A1* | 8/2015 | Ma ....................... | H04L 65/762 370/328 |
| 2016/0381491 | A1* | 12/2016 | Watfa .................... | H04W 4/023 455/41.2 |
| 2016/0381720 | A1 | 12/2016 | Baek et al. | |
| 2018/0234524 | A1* | 8/2018 | Cheng ................... | H04W 76/15 |
| 2018/0255499 | A1* | 9/2018 | Loehr ................... | H04W 40/22 |
| 2018/0287689 | A1* | 10/2018 | Lee ....................... | H04W 76/27 |
| 2019/0141764 | A1* | 5/2019 | Fu ........................ | H04W 76/18 |
| 2019/0394816 | A1* | 12/2019 | Kim ..................... | H04W 76/10 |

FOREIGN PATENT DOCUMENTS

| | | |
|---|---|---|
| CN | 102440024 A | 5/2012 |
| CN | 106162929 A | 11/2016 |
| WO | 2015/141565 A1 | 9/2015 |
| WO | WO 2015/141165 A1 | 9/2015 |
| WO | WO 2016/073984 A2 | 5/2016 |

OTHER PUBLICATIONS

3rd Generation Partnership Project (3GPP), RP-160677, "New SI: Further Enhancements LTE Device to Device, UE to Network Relays for Wearables", Qualcomm Incorporated, Intel, Huawei, HiSilicon, LG Electronics Inc., TSG RAN Meeting #71, Gothenburg, Sweden, Mar. 7-10, 2016, 7 pages.

3rd Generation Partnership Project (3GPP), S2-166358, "Key Issue on Relay Discovery and Selection Enhancement", Huawei, Hisilicon, KPN, SA WG2 Meeting #118, Reno, NV, USA, Nov. 14-18, 2016, pp. 1-4.

3rd Generation Partnership Project (3GPP), TR 22.885 V0.2.0, "Technical Specification Group Services and Systems Aspects; Study on LTE Support for V2X Services (Release 14)", Apr. 2015, pp. 1-33.

3rd Generation Partnership Project (3GPP), TR 23.799 V14.0.0, "Technical Specification Group Services and System Aspects, Study on Architecture for Next Generation System (Release 14)", Dec. 2016, pp. 1-522.

CN 101998495 A, Cited in Office Action dated Oct. 20, 2021, in related to Chinese Patent Application No. 201880006354.3.

CN 101998520 A, Cited in Office Action dated Oct. 20, 2021, in related Chinese Patent Application No. 201880006354.3.

CN 106162929 A, Cited in Office Action dated Oct. 20, 2021, in related Chinese Patent Application No. 201880006354.3.

CN 102440024 A, U.S. Pat. No. 8,576,714 B2.

3rd Generation Partnership Project (3GPP), R2-165528, "V2x QoS", Ericsson, 3GPP TSG-RAN WG2 #95, Gothenburg, Sweden, Aug. 22-26, 2016, pp. 1-3.

3rd Generation Partnership Project (3GPP), R2-168652, "QoS for PC5-Based V2X", Ericsson, 3GPP TSG-RAN WG2 #96, Reno, Nevada, USA, Nov. 14-18, 2016, pp. 1-2.

* cited by examiner

RELAY FOR WIRELESS COMMUNICATION SYSTEM

CROSS-REFERENCE TO RELATED APPLICATIONS

This application is the National Stage entry under 35 U.S.C. § 371 of Patent Cooperation Treaty Application PCT/US2018/013002, filed Jan. 9, 2018, which claims the benefit of U.S. Provisional Patent Application No. 62/444,029, filed Jan. 9, 2017, and U.S. Provisional Patent Application No. 62/501,456, filed May 4, 2017, the disclosures of which are incorporated in their entireties herein.

BACKGROUND

Mobile communication systems continue to evolve from 4G/LTE/LTE-Advanced to a fifth generation called 5G. A system employing LTE, LTE-Advanced, and/or 5G technologies may support device-to-device (D2D) communications in both public (e.g., public safety) and commercial use cases. A wireless transmit receive unit (WTRU) may be configured to facilitate D2D communications in such a system.

SUMMARY

Systems, methods and instrumentalities are disclosed herein relating to the establishment of a connection between a remote WTRU and a relay WTRU. The connection may be established over a radio link interface such as a PC5 interface. The relay WTRU may be authorized by a network to perform relay functions. The relay WTRU may receive a parameter from a network entity relating to the operation of the radio link interface. The parameter may indicate an aggregate maximum bit rate (AMBR) associated with the radio link interface. For example, the AMBR may indicate a maximum allowed bit rate of the relay WTRU for communicating with one or more remote WTRUs.

The relay WTRU may receive a request from a remote WTRU to connect with the relay WTRU over the radio link interface. The request may include one or more quality of service (QoS) parameters (e.g., QoS requirements) for the connection including, for example, one or more of a QoS Class Identifier (QCI), a 5G QoS indicator (5QI), a ProSe Per Packet Priority (PPPP) (e.g., a PPPP bit rate), or an expected bit rate. The relay WTRU may receive, from a network entity, an indication of a priority assigned to the connection between the remote WTRU and the relay WTRU. The relay WTRU may receive the priority information after sending an inquiry to the network entity about the connection request from the remote WTRU.

Based on the AMBR, the QoS parameters included in the request and the priority information received from the network entity, the relay WTRU may determine whether to accept or reject the request from the remote WTRU. If the relay WTRU decides to accept the request, the relay WTRU may send a response to the remote WTRU and may include in the response an indication of allowed QoS for the connection with the remote WTRU. If the relay WTRU decides to reject the request, the relay WTRU may send a response to the remote WTRU indicating that its request has been rejected. The response may include a cause value informing the remote WTRU why its request has been rejected. For example, the cause value may indicate that the request has been rejected because of congestion at the relay WTRU. The relay WTRU may broadcast a flag to indicate that it is experiencing congestion. The relay WTRU may decide to accept the connection request from the remote WTRU despite the congestion. To do that, the relay WTRU may release a connection with another remote WTRU that has already been established.

BRIEF DESCRIPTION OF THE DRAWINGS

A more detailed understanding may be had from the following description, given by way of example in conjunction with the accompanying drawings wherein.

DETAILED DESCRIPTION

Figure 1A:
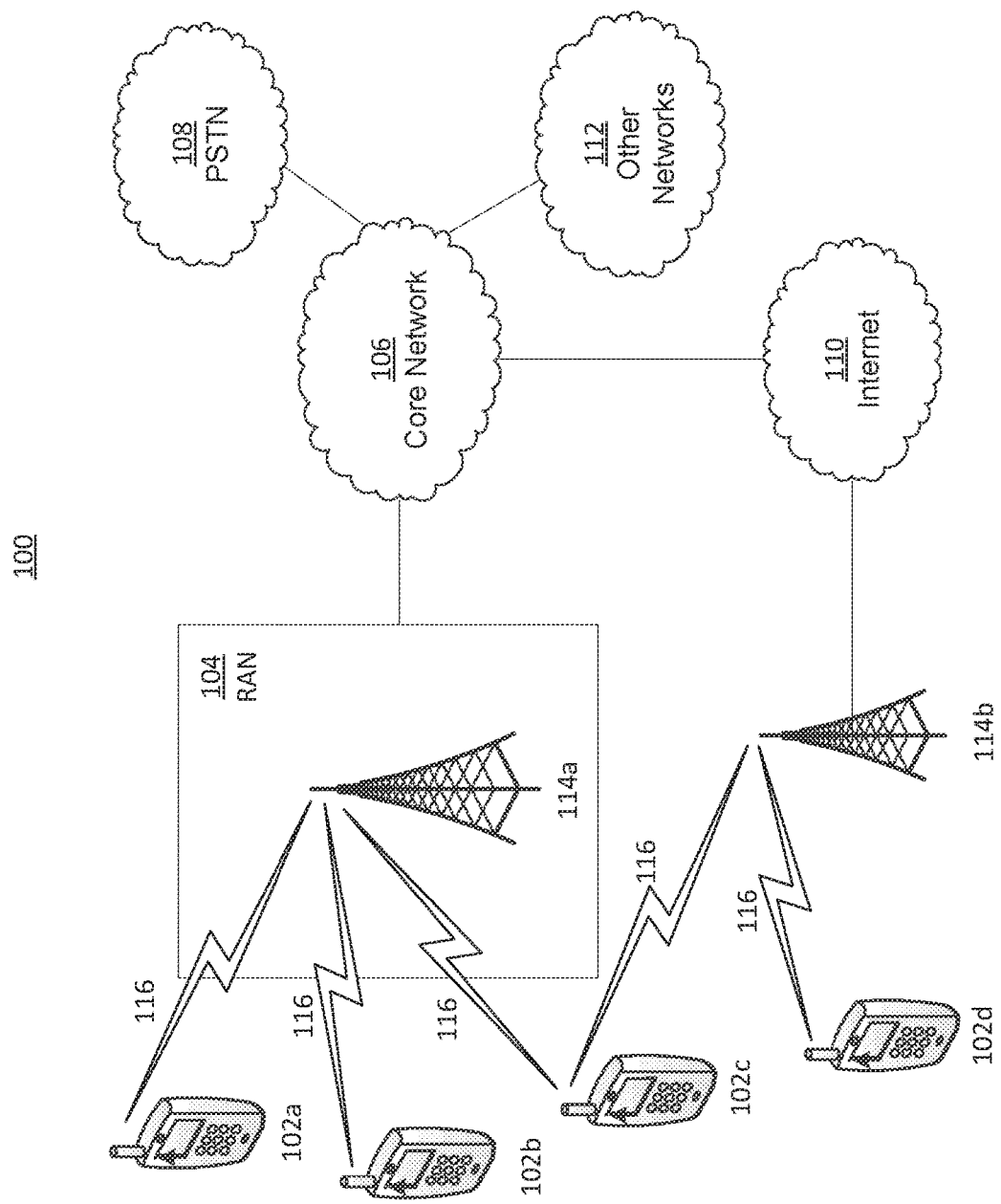
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
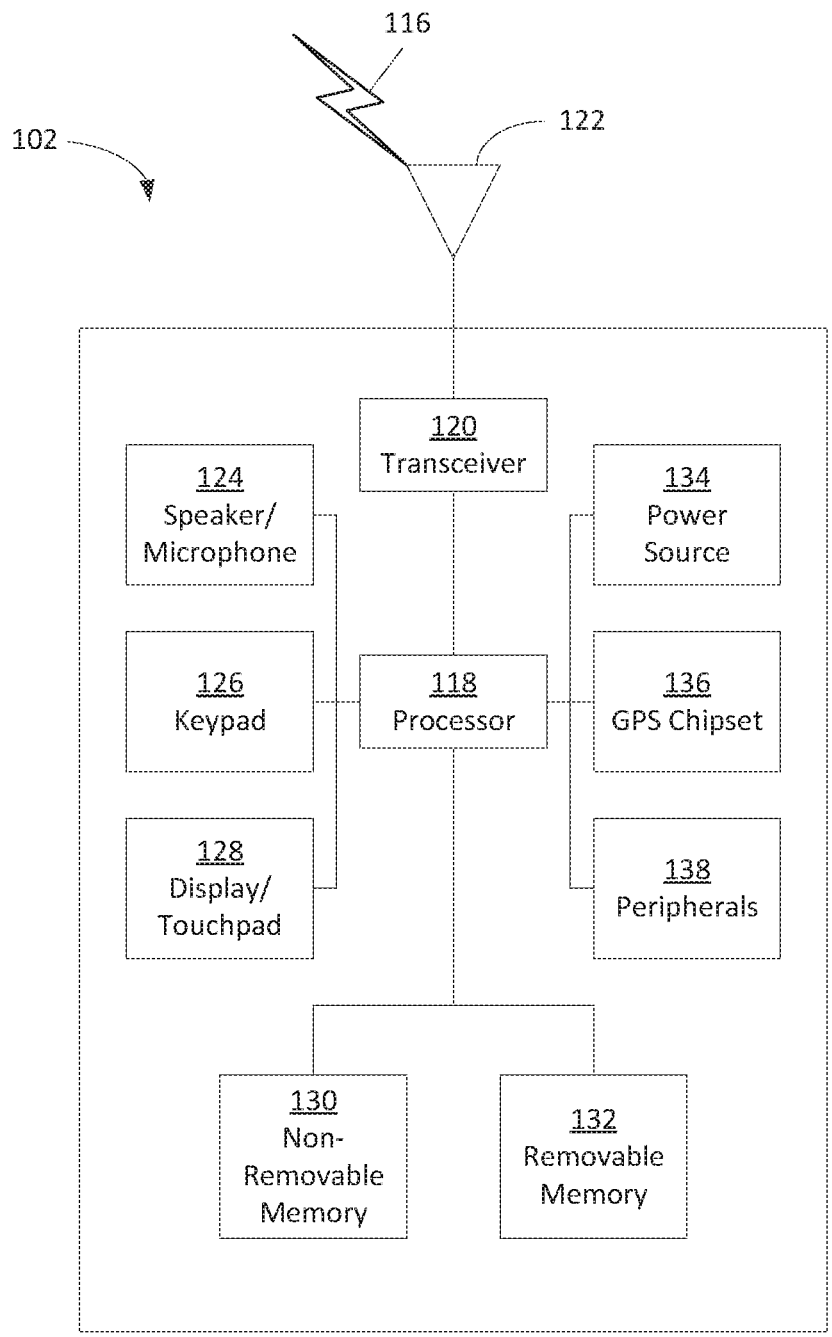
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
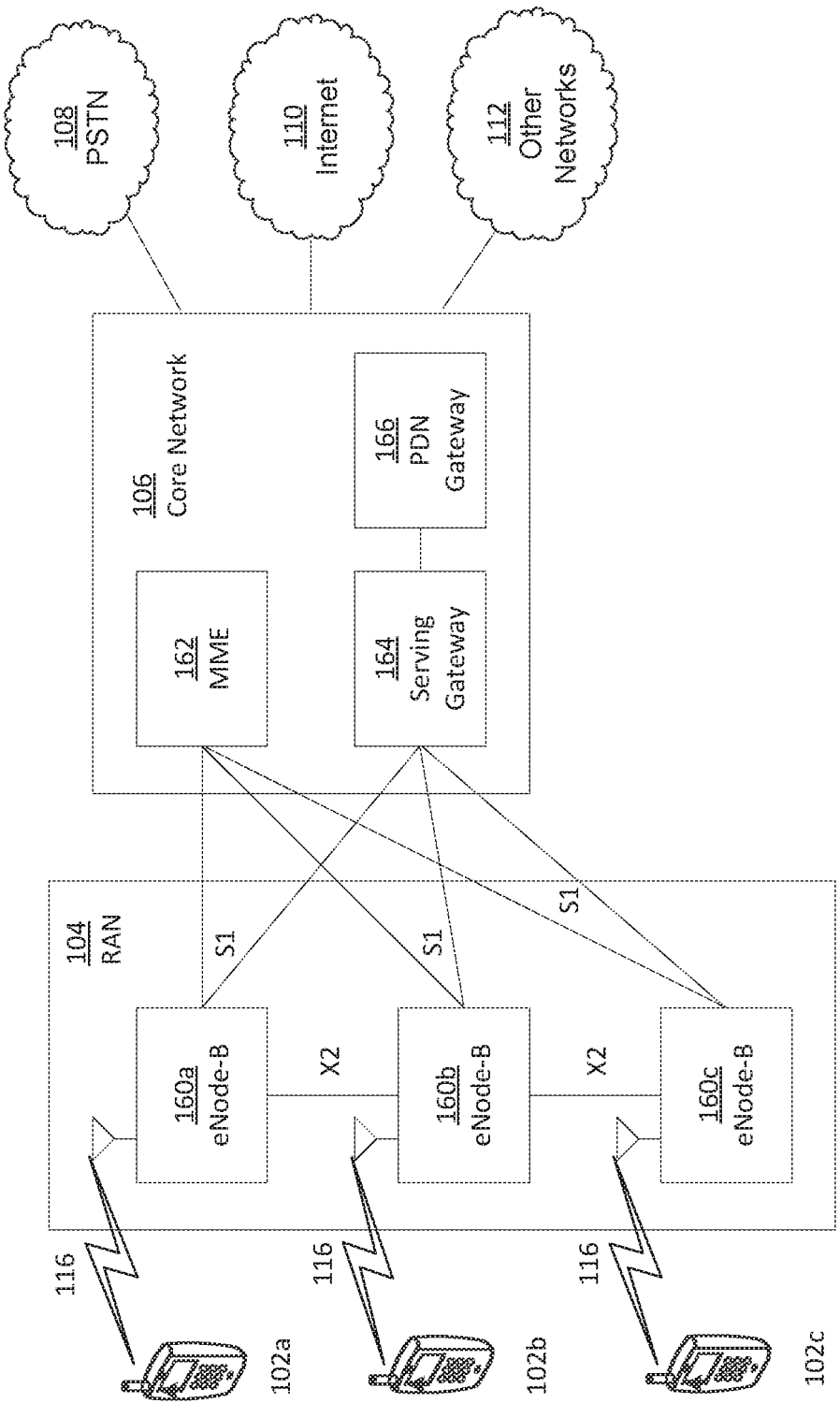
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
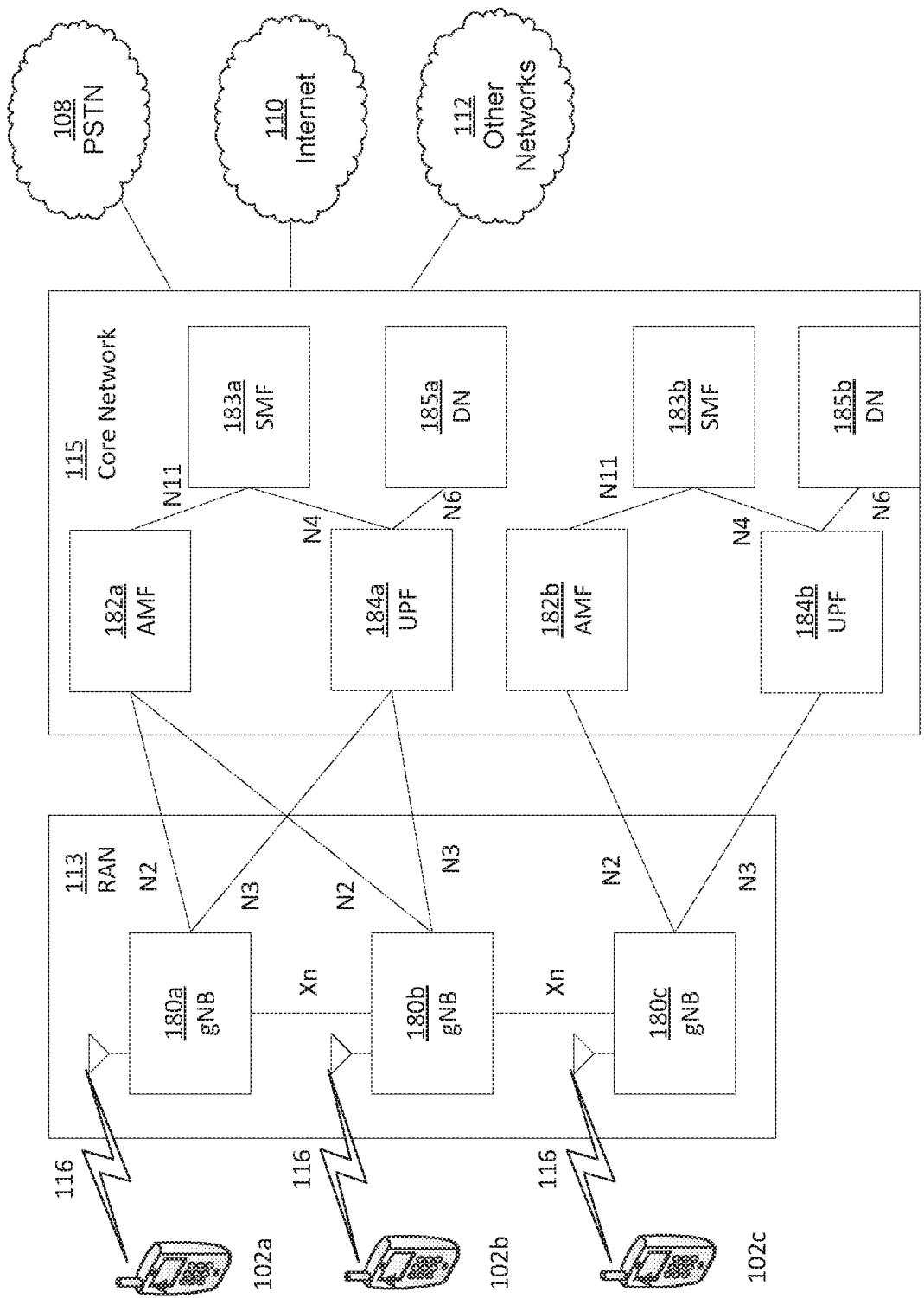
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Device-to-device (D2D) communication technologies may be utilized in public safety use cases. These technologies may allow for cost-effective and/or high-capability communications. The technologies may facilitate harmonization of radio access technologies across different regions, and may lower the capital expenditure (CAPEX) and/or operating expenses (OPEX) associated with establishing and operating a communication system. Scalable wideband radio solutions (e.g., such as LTE and/or 5G solutions) may allow multiplexing of different service types such as voice and/or video services.

Public safety use cases may occur in areas that may not be under the coverage of a wireless communication network such as a 5G or LTE cellular network. Examples of such areas may include tunnels, deep basements, or places experiencing catastrophic system outages. Having the ability to perform D2D communications may be desirable in these areas (e.g., in the absence of an operating communication network or prior to the deployment of an Ad Hoc radio infrastructure). Even when an operating network infrastructure does exist, public safety related communications may have higher reliability requirements than commercial communication services. Examples of public safety use cases may include communication links between first responders and direct push-to-talk speech services that involve multiple talk groups. Public safety applications may utilize services such as video push or download.

D2D communication technologies may be employed for commercial purposes. For example, utility companies may use 2-way radio communications in areas not covered by a network. D2D services such as discovery services may provide a suitable signaling mechanism for many use cases including proximity based services and/or traffic offloading.

Figure 2:
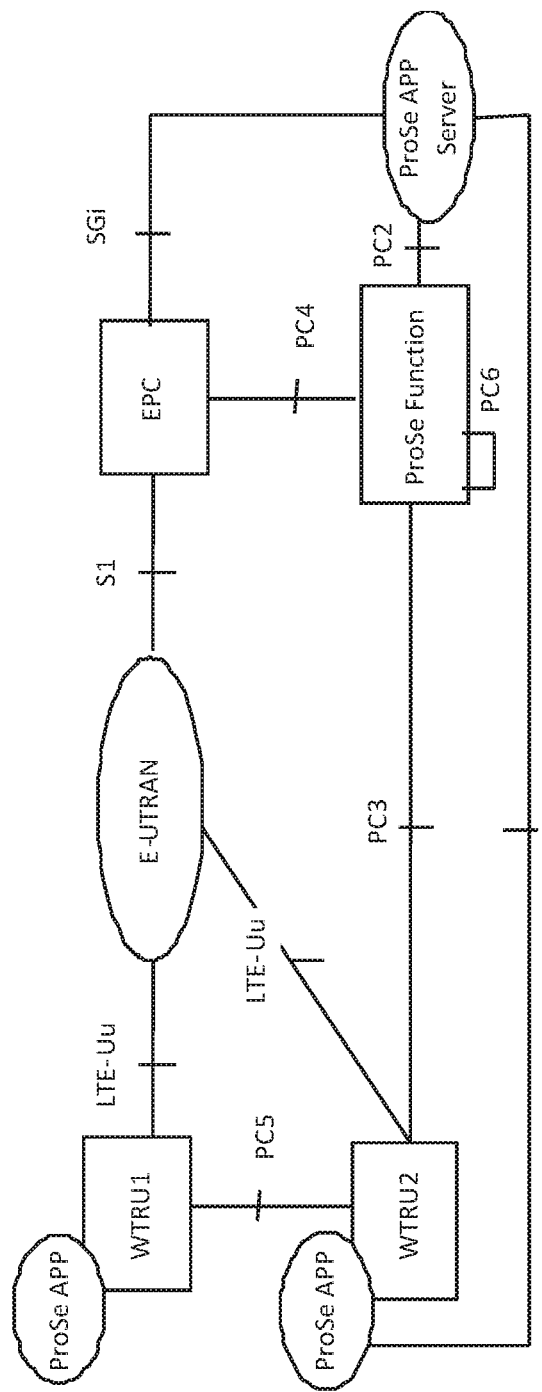
FIG. 2 is a diagram illustrating an example D2D communication architecture utilizing a Proximity Service (ProSe) function.

FIG. 2 is a diagram illustrating an example D2D communication architecture utilizing a Proximity Service (ProSe) function. The architecture may be used to facilitate D2D communications such as providing various interfaces for D2D communication devices. As shown, a first WTRU (e.g., WTRU1) and a second WTRU (e.g., WTRU2) may communicate with an E-UTRAN network (e.g., a base station such as an eNB or gNB) via a Uu interface such an LTE-Uu interface or a 5G new radio interface. Direct D2D communications between WTRU1 and WTRU2 may be transmitted and received over a radio link interface such as a PC5 interface, which may also be referred to as a sidelink. An application layer running a ProSe function at a WTRU (e.g., WTRU1 and/or WTRU2) may communicate with a ProSe Application Server at the application layer via a logical interface (e.g., PC1). The logical interface between a ProSe capable WTRU and a ProSe function may be referred to as a PC3 interface. A PC3 interface may be part of (e.g., serve as an interface to) an Evolved Packet Core (EPC) network. For example, a PC3 interface may be part of (e.g., serve as an interface to) a 5G core network.

The wireless communication systems described herein may be used to connect and/or manage low cost Machine Type Communication (MTC) devices. Examples of such low cost MTC devices may include wearable devices (e.g., wearables). Wearables may be in close proximity to a WTRU (e.g., a smartphone) and may serve as relays.

Figure 3:
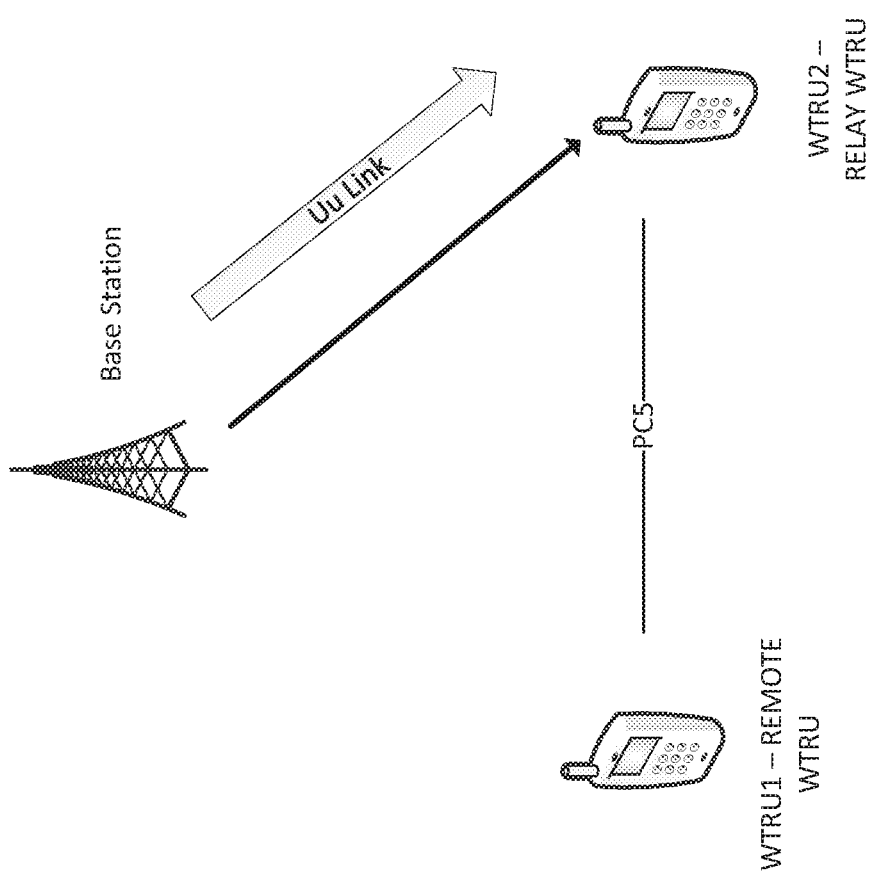
FIG. 3 is a diagram illustrating an example relay architecture that includes a ProSe function.

FIG. 3 is a diagram illustrating an example relay architecture that includes a ProSe function. As shown, a first WTRU (e.g., WTRU2) may be a relay WTRU that communicates with a network entity such as a RAN node via a Uu link. The RAN node may a base station (e.g., an eNB or gNB). WTRU2 may communicate with a remote WTRU (e.g., WTRU1) via a radio link interface such as a PC5 interface. Data and/or control signaling between WTRU1 and the base station may be routed via WTRU2.

Certain WTRU-to-Network relay architectures may not differentiate remote WTRU traffic from the traffic routed through a relay WTRU in the access stratum. This may limit the ability of a network and/or operator to treat a remote WTRU as a separate device, for example, for billing and/or security purposes. Certain security associations may not cover a communication link from end to end (e.g., between a network and a remote WTRU). For example, a relay WTRU may obtain clear text access to the communications of a remote WTRU. These architectures and/or security associations may be modified to support end-to-end security.

For example, WTRU-to-Network relay may be realized through a relay link. WTRU-to-Network relay may consider service continuity. WTRU-to-Network relay may be designed to provide End-to-End Quality of Service (E2E QoS). WTRU-to-Network relay may be designed to support efficient operation with multiple remote WTRUs. WTRU-to-Network relay may utilize efficient path switching between Uu and D2D air interfaces.

Relay may be implemented for D2D communication devices that utilize non-3GPP technologies such as Bluetooth and/or Wi-Fi. Service continuity may make relay suitable for these non-3GPP technologies in commercial use cases. For example, wearable devices may utilize relay due to their frequent use in the proximity of a WTRU (e.g., a user's smartphone) and/or form-factor limitations that may make a direct Uu connection to a network impractical (e.g., due to battery size limitations).

Relay may enable power savings for remote WTRUs. For example, a remote WTRU may conserve power by having part or all of its traffic relayed. Relay may also enable power savings in deep coverage scenarios. Uni-directional D2D links between remote devices and relay devices may be used to facilitate relay. A relay WTRU may be utilized to relay uplink data (e.g., only uplink data) from a remote WTRU so that the remote WTRU may be able to receive D2D communications without additional RF capabilities.

Reliable unicast radio links (e.g., PC5 links) may be implemented to support devices characterized by one or more of low power consumption, low transmission rates, low complexities, or low costs. One or more design considerations for Narrow Band Internet of Things (NB-IoT) and/or eMTC devices may be applicable to low cost D2D devices. For example, the uplink waveforms used by NB-IoT and/or eMTC devices may also be used by D2D devices. Further, a D2D device may be capable of communicating with the Internet, cloud and/or proximal devices via a single modem.

Certain PC5 link designs such as those related to broadcast oriented design principles and driven by public safety use cases may cause bottleneck situations and increase the difficulty of low power and/or reliable D2D communications (e.g., due to lack of link adaptation and/or a feedback mechanism). These designs may be modified to achieve target performance metrics for low power devices, low complexity devices, small form factor devices, and/or devices with long battery lives. As described herein, these devices may include wearables and/or MTC devices. The target performance metrics may reflect power consumption, spectrum efficiency, device complexity, and/or the like.

Relay discovery techniques associated with public safety use cases may have unique characteristics. For example, ProSe relay discovery messages used by public safety applications may not take Public Land Mobile Network (PLMN) information into consideration because of security or safety concerns. Certain public safety relay discovery schemes may not support discovery without pre-configuration information. One or more aspects of these relay discovery techniques may be modified and/or re-defined to suit commercial purposes. For example, an evolved ProSe remote WTRU may be configured to support open discovery (e.g., without requiring a trust relationship) and/or restricted discovery (e.g., which may require a trust relationship). A WTRU may be configured to support multiple models of ProSe discovery. For example, in a first model (e.g., Model A discovery), a relay WTRU may announce a discovery code (e.g., a code that indicates one or more parameters regarding one or more services that the relay WTRU can support). A remote WTRU may monitor the discovery code announced by the relay WTRU, e.g., during a discovery procedure and/or by using a discovery filter (e.g., a filter utilized by the remote WTRU to identify one or more discovery codes that the remote WTRU is interested in). In a second model (e.g., Model B discovery), a remote WTRU may send a solicitation message with discovery information. A relay WTRU meeting certain discovery requirements or criteria may respond to the solicitation message. The requirements and/or criteria may be preconfigured/predefined. One or more parameters or types of discovery information may be included in an evolved WTRU-to-network relay discovery message. These parameters or types of discovery information may allow a remote WTRU to discover and/or select an appropriate relay WTRU.

Discovery between a relay WTRU and a remote WTRU may be followed by connection establishment. During such connection establishment, a relay WTRU may become congested. For example, a relay WTRU may be supporting PC5 connections for multiple WTRUs and thus have difficulty accepting a connection request from a new remote WTRU. In those situations, the relay WTRU may still decide to accept a connection request by a certain remote WTRU (e.g., because that remote WTRU is a high priority WTRU). The relay WTRU may disconnect a presently connected remote WTRU in order to accept the new connection request. The relay WTRU may need assistance in deciding which one or more new connections to accept and/or which one or more remote WTRUs to disconnect under congested conditions. The assistance may be provided, for example, by a network entity and/or a remote WTRU trying to connect with the relay WTRU. The network entity may be a base station (e.g., an eNB or gNB), a cell, a transmission/reception point (TRP), and/or an equivalent network control point.

Figure 4:
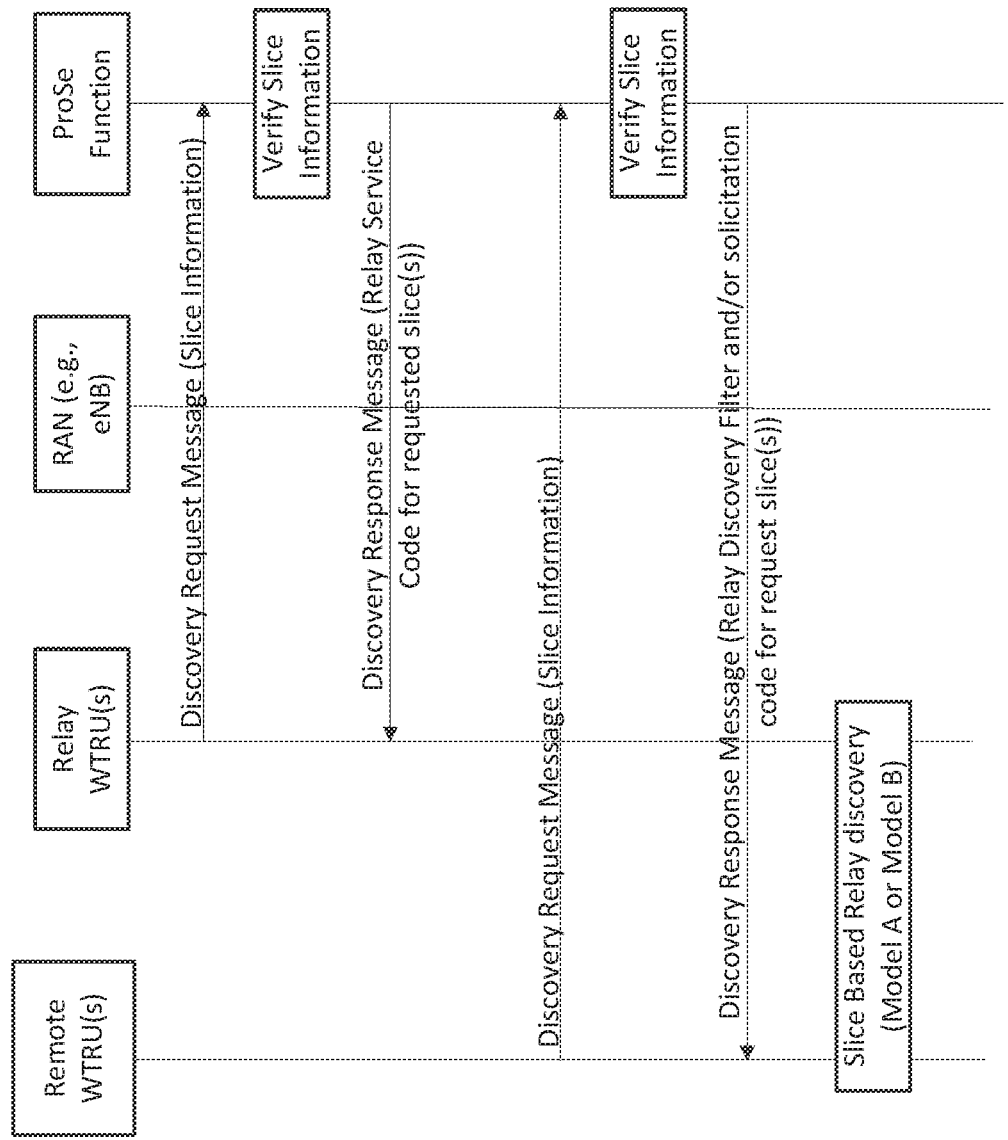
FIG. 4 is a diagram illustrating example message flows associated with the establishment of a network connection.

FIG. 4 is a diagram illustrating example message flows associated with the establishment of a network connection. A relay WTRU may send a discovery request message to a network entity (e.g., a ProSe function associated with the network entity) to initiate discovery with the network entity. The network entity may include a RAN node such as a eNB or gNB, for example. The discovery request message may include information associated with one or more network slices. For example, the discovery request message may indicate one or more network slices in which the relay WTRU may be able to perform relay functions (e.g., acting as a relay for one or more remote WTRU(s) that are attempting to connect to the network slice(s)). The discovery request message may include one or more relay service codes for the indicated network slice(s).

The network entity may verify (e.g., via the ProSe function) the information included in the discover request message and send a discovery response to the relay WTRU. The relay WTRU may perform discovery according to the discovery response (e.g., using Model A or Model B discovery procedure described herein). The discovery may be performed using one or more the relay service codes described herein. For example, the relay service codes for the requested slices may be included in discovery messages sent by the relay WTRU.

As shown in FIG. 4, a remote WTRU may send a discovery request message to a network entity (e.g., a ProSe function associated with the network entity). The discovery request message may include information relating to one or more network slices. For example, the information may indicate one or more network slices that the remote WTRU may want to access through a relay WTRU. The discovery request message may include one or more relay service codes and/or one or more relay discovery filters associated with the requested network slice(s). The network entity may verify (e.g., via the ProSe function) the information included in the discovery request message and may send a discovery response to the remote WTRU. The remote WTRU may perform discovery according to the discovery response (e.g., using Model A or Model B discovery procedure described herein). The discovery may be performed using the code(s) and/or filter(s) described above. For example, the remote WTRU may transmit the received solicitation code in order to trigger a response from a relay WTRU that supports a slice associated with the solicitation code (e.g., in order to perform connection establishment with the relay WTRU). In an example, the remote WTRU may process one or more discovery codes received from a relay WTRU in a discovery message using the received discovery filter to determine whether the relay WTRU(s) support a slice that the remote WTRU would like to utilize (e.g., in order to perform connection establishment with the relay WTRU).

A relay WTRU may broadcast one or more of relay service codes (e.g., ProSe codes). The codes may indicate one or more network slices and/or Protocol Download Unit (PDU)/Packet Data Network (PDN) sessions that the relay WTRU may be able to connect to. The relay WTRU may (e.g., upon requesting a relay service code during discovery) include network slice assistance information (NSSAI) in a discovery request message sent to a network entity (e.g., a ProSe function associated with the network entity). The relay WTRU may include a subset of NSSAI, such as Session management NSSAI (SM-NSSAI and/or S-NSSAI), in the discovery request message. In certain discovery scenarios (e.g., Model A discovery scenario), the relay WTRU may announce one or more relay service codes in a radio link discovery message (e.g., a PC5 discovery message). In certain discovery scenarios (e.g., Model B discovery scenario), the relay WTRU may send one or more relay service codes in a radio link discovery message (e.g., a PC5 discovery message) in response to a remote WTRU sending a solicitation message.

When a network entity (e.g., a ProSe function associated with the network entity) receives network slice information such as NSSAI or SM-NSSAI from a WTRU (e.g., a relay WTRU) in a discovery request message, the network entity may verify (e.g., via the ProSe function) with other network entities and/or functions whether the WTRU is authorized to access the network slice(s) indicated by the NSSAI or SM-NSSAI. The network entity may verify whether the WTRU is allowed to transmit traffic (e.g., relay traffic) for one or more remote WTRUs in the network slices.

A relay WTRU may support connection to multiple network slices. The relay WTRU may include information associated with the multiple network slices in a discovery request message. For example, the relay WTRU may include one or more NSSAIs/SM-NSSAIs in the discovery request message. A network entity (e.g., a ProSe function associated with the network entity) may determine whether the relay WTRU can act as a relay in the network slices. The network entity (e.g., via the ProSe function) may request inputs from other network entities (e.g., a subscriber database and/or other functions in the control plane) regarding the discovery request. These functions may include an AMF, a Session Management Function (SMF), and/or a Policy Function (PCF), for example. Based on the inputs and other information included in the discovery request message, the network entity (e.g., via the ProSe function) may decide whether the relay WTRU can perform relay functions for the requested network slices.

A network entity (e.g., a ProSe function associated with the network entity) may respond to a discovery request message with a discovery response. The discovery response may include multiple relay service codes, e.g., if the relay WTRU sending the discovery request message included network slice information in the discovery request message. For example, the discovery response message may include a relay service code corresponding to an identifier of a requested slice (e.g., SM-NSSAI). The relay service code may indicate one or more network slice IDs for which the WTRU can act as a relay.

A relay WTRU may broadcast received relay service code(s) over a radio link interface message such as a PC5 message. The relay WTRU may announce the relay service code(s) (e.g., in Model A discovery scenario). The relay WTRU may broadcast the relay service code(s) in response to a solicitation message (e.g., in Model B discovery scenario).

In certain discovery scenarios (e.g., Model B discovery scenario), a relay WTRU may include in a discovery message one or more relay service codes associated with a network slice ID that the relay WTRU may be solicited for. For example, if a remote WTRU specifies a particular slice ID and/or slice type in a solicitation request (e.g., which may be included in a PC5 discovery message), a relay WTRU may respond with a relay service code specific to that particular slice. If the remote WTRU does not include a specific slice ID or slice type in a solicitation message, the relay WTRU may include some or all of its relay service codes in a PC5 discovery message.

A relay WTRU may transmit multiple PC5 discovery messages, e.g., each with a relay service code for a different slice type. In certain scenarios (e.g., Model A discovery scenario), a relay WTRU may announce some or all of the relay service codes received by the relay WTRU in one PC5 discovery message. In certain scenarios, a relay WTRU may include different relay service codes associated with different types of slices in different (e.g., multiple) PC5 discovery messages.

A relay WTRU may broadcast a same relay service code for different network slices. For example, the relay WTRU may be allowed by a network to transmit data for different network slices, in which case the relay WTRU may include a same relay service code and different NSSAIs that are associated with the allowed network slices in a discovery message. The NSSAIs may include respective slice IDs for the allowed network slices, for example.

A relay WTRU implementing LTE technologies may include one or more Access Point Name (APNs) or decor ID (DCNs) in a discovery request message sent to a network entity (e.g., a ProSe function associated with the network entity). The network entity (e.g., via the ProSe function) may respond with APNs/DCNs that the WTRU is allowed to support for remote WTRU data transmissions. The relay WTRU may broadcast one or more relay service codes for a requested and allowed APN/DCN. The relay WTRU may broadcast a same relay service code for multiple APNs/DCNs.

A PC5 discovery message broadcasted by a relay WTRU (e.g., in Model A and/or Model B scenarios) may include a status information field. The relay WTRU may use the status information field and/or one or more other information elements in the PC5 discovery message to indicate whether the relay WTRU has an active connection to a particular network slice. In the case of a relay WTRU implementing LTE technologies, the same may be used to indicate if there is an active PDN connection to a particular supported APN.

A relay WTRU may support multiple slices or APNs. However, the relay WTRU may not have an active session management/PDU connection to some or all of the network slices. The relay WTRU may inform a remote WTRU whether an active session management/PDU connection to a supported slice/APN is being maintained. Such information may be used by the remote WTRU to determine whether the relay WTRU is suitable for relay services when the remote WTRU receives a PC5 discovery message from the replay WTRU.

A relay WTRU may experience congestion and may broadcast the level of congestion as part of a discovery message (e.g., a PC5 discovery message). The congestion level may indicate whether the level is none, low, medium or high. The congestion level may be represented by a numerical value (e.g., 1-10). For example, 1 may indicate the lowest level and 10 may indicate the highest level. The congestion level may be considered by a remote WTRU (e.g., as an input factor) during relay selection.

The communication described herein between a relay WTRU and a network entity (e.g., a ProSe function associated with the network entity) may be performed via a non-access stratum (NAS) or N1 interface between the relay WTRU and the network entity, or via an interface (e.g., PC3) between the WTRU and a ProSe function associated with the network entity. If the ProSe function is part of the core network, then NAS may be used for the exchange of PC3 messages between the WTRU and the ProSe function. If the ProSe function is part of an AMF in the core network, the message exchange between the WTRU and the ProSe function may occur over NAS signaling or NG1 signaling. In a network utilizing LTE technologies, the signaling described herein may occur over a PC3 interface between the relay WTRU and the ProSe function.

A remote WTRU may include network slice information in a discovery request message. The discovery request message may be transmitted to a network entity (e.g., a ProSe function associated with the network entity). The network entity may verify (e.g., via the ProSe function) the request from the remote WTRU. The network entity may (e.g., via the ProSe function) contact various network entities/functions and receive inputs from those network entities/functions to confirm whether the remote WTRU is authorized to access the requested network slice(s). The various network functions may include a subscriber database, an AMF, a Session Management Function (SMF), a Policy Control Function (PCF), and/or the like. Upon successful verification of the request, the network entity (e.g., via the ProSe function) may respond to the remote WTRU with a slice specific discovery filter, e.g., in a discovery response message.

A remote WTRU may send a request to connect to one or more network slices. A network entity (e.g., a ProSe function associated with the network entity) may determine, as described herein, whether the remote WTRU is authorized to access the requested slice(s). The network entity may (e.g., via the ProSe function) respond to the remote WTRU by sending one or more discovery filters for the requested network slices, e.g., in at least Model A discovery scenario. The network entity may (e.g., via the ProSe function) respond to the remote WTRU by sending a solicitation code for a requested slice ID (e.g., for every requested sliced ID), e.g., in at least Model B discovery scenario. If the remote WTRU requests discovery for multiple network slices and the remote WTRU is authorized to access the multiple slices, multiple solicitation codes per network slice may be sent to the remote WTRU in a discovery response message.

A remote WTRU may monitor relay service codes broadcasted by a relay WTRU based on one or more received discovery filters, e.g., for Model A discovery scenario. A remote WTRU may send one or more received ProSe solicitation codes associated with a desired network slice, e.g., in Model B discovery scenario, and may expect a response from a relay WTRU that supports the network slice. Slice information may be one of a plurality of criteria with which a remote WTRU and a relay WTRU may discover each other.

A relay WTRU may broadcast and/or transmit a same relay service code for different network slices. A relay WTRU may include multiple slice IDs in a PC5 discovery message. If a relay WTRU includes multiple slice IDs in a PC5 discovery message, a remote WTRU may inspect the PC5 discovery message for the slice ID that the remote WTRU is interested in. This technique may be applied in the Model A discovery scenario, for example. A remote WTRU may include one or more slice IDs in a PC5 discovery solicitation message, e.g., in the Model B discovery scenario. A relay WTRU may support a requested network slice, provide services for a solicitation code associated with the network slice, and respond to the remote WTRU by sending a PC5 discovery response message.

A remote WTRU utilizing LTE technologies may perform discovery with a network entity (e.g., a ProSe function associated with the network entity). The remote WTRU may include one or more APNs/DCNs in a discovery request message. One or more discovery filters (e.g., for Model A discovery) or ProSe solicitation codes (e.g., for Model B discovery) may be allocated and sent to the remote WTRU by the network entity in a discovery response message (e.g., via the ProSe function).

Figure 5:
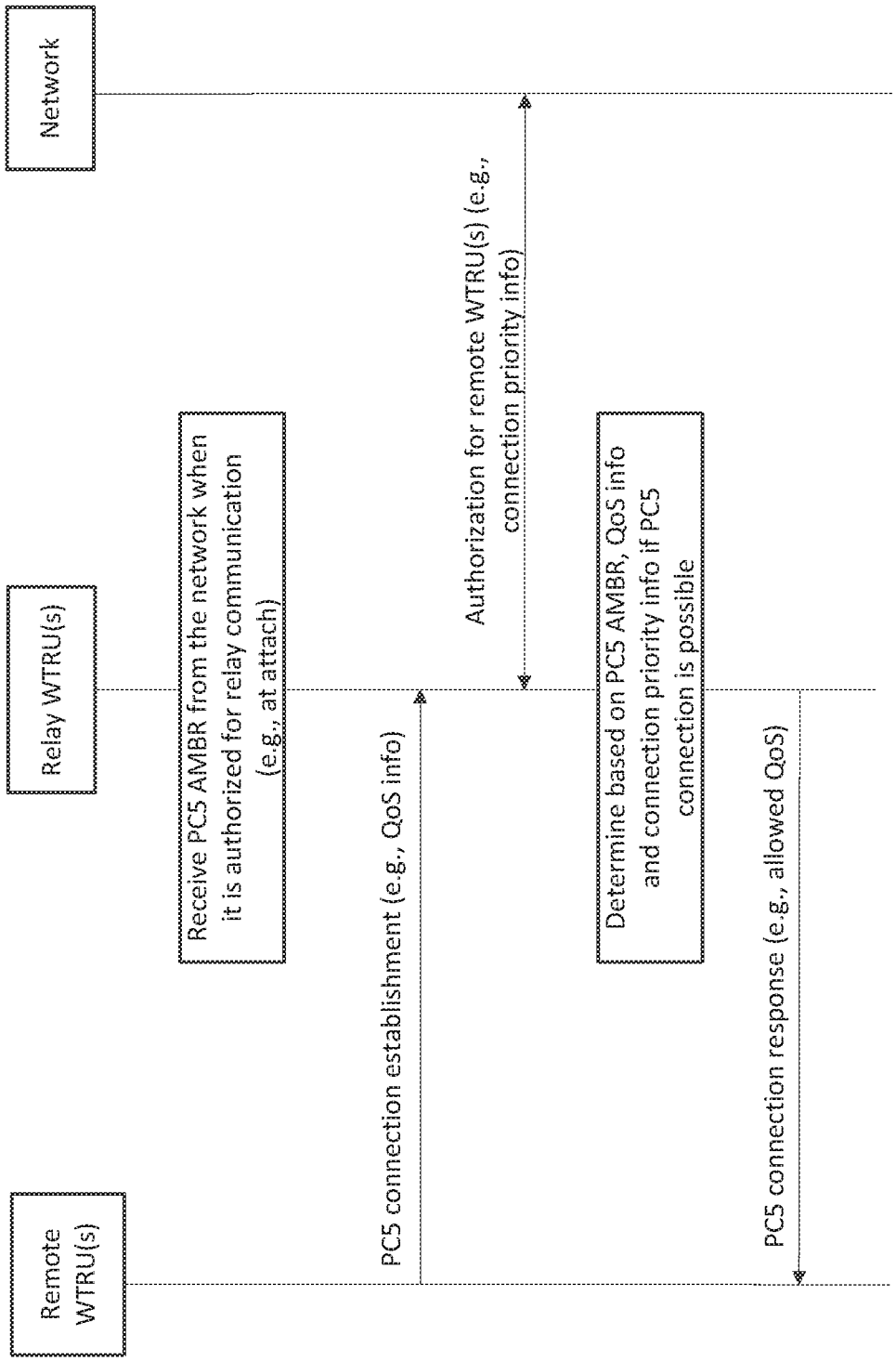
FIG. 5 is a diagram illustrating an example procedure for establishing a network connection.

FIG. 5 is a diagram illustrating an example connection establishment procedure. The procedure may be performed in various scenarios including, e.g., when a relay WTRU is congested. A remote WTRU may send a connection request message to a relay WTRU. The connection request may be related to a PC5 connection, for example. The connection request message may include quality of service (QoS) information (e.g., QoS requirements) associated with the requested connection. The QoS information may indicate a level of QoS desired by the remote WTRU for the connection, for example. The QoS information may include a QoS class identifier (QCI), a 5G QoS indicator (5QI), a ProSe per packet priority (PPPP) (e.g., a PPPP bit rate), and/or an expected bit rate, for example.

The relay WTRU may receive one or more parameters from a network entity (e.g., a base station) relating to PC5 connections through the relay WTRU. For example, the one or more parameters may include an aggregate maximum bit rate (AMBR) indicating a maximum allowed bit rate of the relay WTRU for communicating with one or more (e.g., all) remote WTRUs via a PC5 interface. The AMBR may apply to non-guaranteed bit rate (GBR) PC5 traffic or both GBR and non-GBR types of traffic. If the AMBR is applicable to GBR traffic but not to non-GBR traffic, the relay WTRU may receive, from the network, a separate maximum bit rate for GBR traffic between the relay WTRU and some or all of the remote WTRUs connected to the relay WTRU.

The relay WTRU may be authorized by the network to perform relay functions (e.g., with respect to one or more network slices). The relay WTRU may receive the authorization when the relay WTRU is attached to (e.g., register with) the network. The authorization may be provided via an authorization message, for example.

The relay WTRU may receive connection priority information (e.g., retention priority) associated with a PC5 connection. The connection priority information may indicate a priority assigned to a PC5 connection from a specific remote WTRU. The connection priority information may be included in the relay authorization message described herein, for example. The connection priority information may also be included in a response to the relay WTRU upon receiving an inquiry from the relay WTRU regarding a particular PC5 connection request. The relay WTRU may receive the connection priority information from a network entity such as an AMF, an MME or a ProSe function.

Upon receiving a connection request from a remote WTRU, the relay WTRU may determine whether to accept (e.g., grant) or reject the connection request. The determination may be made based on parameters received from the network (e.g., relating to PC5 AMBR), QoS information included in the connection request, and/or connection priority information associated with the remote WTRU (e.g., which may indicate whether a PC5 connection from the remote WTRU is possible at all). For example, the relay WTRU may consider its current load (e.g., the relay WTRU may be serving other remote WTRUs at the same time), and determine whether accepting the connection request would result in a PC5 AMBR being exceeded. The relay WTRU may consider whether it is able to accommodate the QoS requirements specified in the connection request. The relay WTRU may consider whether the request from the remote WTRU has a higher or lower priority than requests sent by other remote WTRUs.

If the relay WTRU determines that a connection request from a first remote WTRU should be accepted but resources are limited, the relay WTRU may release a connection with another remote WTRU currently connected to the relay WTRU. The relay WTRU may send a connection release notification to the other remote WTRU informing that WTRU its connection is being released and/or why the connection is being released. The relay WTRU may send a response message to the first remote WTRU indicating whether the relay WTRU may be able to serve the first remote WTRU. The relay WTRU may send a PC5 connection response message to the first remote WTRU indicating whether the relay WTRU may be able to serve the first remote WTRU. The PC5 connection response message may include an indication of allowed or achievable QoS relating to the connection. For example, the response message may indicate the type of service(s) that may be allowed on the connection.

If the relay WTRU decides to reject the connection request from the first remote WTRU, the relay WTRU may include a cause value in the response message informing the first remote WTRU why its connection request cannot be accepted. For example, the relay WTRU may indicate to the first remote WTRU, via the cause value, that its connection request cannot be granted due to congestion at the relay WTRU.

When a remote WTRU receives a connection release or connection reject message with a cause code, the remote WTRU may be configured to refrain from trying to connect with the same relay WTRU for a specific time period. Such a time period may be configured by the network, e.g., through a timer included in the connection release or connection reject message. The remote WTRU may try to establish connection with the relay WTRU when the received timer expires. The relay WTRU may broadcast a congestion flag as described herein. In that case, a remote WTRU may cancel a received timer upon determining that the congestion flag is no longer broadcasted.

Features, elements and actions (e.g. processes and instrumentalities) are described herein by way of non-limiting examples. While examples are directed to LTE, LTE-A, NR or 5G protocols, the relevant subject matter is applicable to other wireless communications, systems, services and protocols. Each feature, element, action or other aspect of the described subject matter, whether presented in figures or description, may be implemented alone or in any combination, including with other subject matter, whether known or unknown, in any order, regardless of examples presented herein.

Each of the computing systems described herein may have one or more computer processors having memory that are configured with executable instructions or hardware for accomplishing the functions described herein including determining the parameters described herein and sending and receiving messages between entities (e.g., WTRU and network) to accomplish the described functions. The processes described above may be implemented in a computer program, software, and/or firmware incorporated in a computer-readable medium for execution by a computer and/or processor.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed:

1. A method implemented in a first wireless transmit receive unit (WTRU), the method comprising:
    receiving, from a network entity, configuration information for communication associated with a radio link interface between the first WTRU and a second WTRU, the configuration information indicating a bit rate information for communicating with the second WTRU via the radio link interface and a priority associated with the radio link interface, wherein the bit rate information comprises an aggregate maximum bit rate (AMBR) for non-guaranteed bit rate (GBR) traffic;
    receiving, from the second WTRU, a request for a connection to the first WTRU via the radio link interface;
    determining to reject the request for the connection from the second WTRU based on at least the AMBR for non-GBR traffic and the priority indicated by the received configuration information; and
    sending a response to the second WTRU, wherein the response indicates that the request has been rejected.

2. The method of claim 1, wherein the determining to reject the request from the second WTRU comprises comparing the priority indicated by the configuration information with respective priorities associated with one or more other connections between the first WTRU and one or more other WTRUs.

3. The method of claim 1, further comprising receiving an authorization message from the network entity, wherein the authorization message indicates that the first WTRU is to act as a relay WTRU.

4. The method of claim 3, wherein the configuration information is included in the authorization message.

5. The method of claim 1, wherein the determining to reject the request from the second WTRU is based further on at least one of a QoS Class Identifier (QCI) or a 5G QoS indicator (5QI) associated with the radio link interface.

6. The method of claim 1, wherein, based on the determination to reject the request from the second WTRU, the response sent to the second WTRU indicates a reason for the rejection.

7. The method of claim 6, wherein the reason indicates that the request has been rejected because of congestion at the first WTRU.

8. The method of claim 1, further comprising the steps of determining to accept the request for the communication from the second WTRU, and releasing another connection between the first WTRU and a third WTRU.

9. The method of claim 1, further comprising, upon receiving the request from the second WTRU, sending an inquiry to the network entity regarding the request.

10. A first wireless transmit receive unit (WTRU), comprising:
    a processor configured to:
    receive, from a network entity, configuration information for communication associated with a radio link interface between the first WTRU and a second WTRU, the configuration information indicating a bit rate information for with the second WTRU via the radio link interface and a priority associated with the radio link interface, wherein the bit rate information comprises an aggregate maximum bit rate (AMBR) for non-guaranteed bit rate (GBR) traffic;
    receive, from the second WTRU, a request for a connection to the first WTRU via the radio link interface;
    determine to reject the request for the connection from the second WTRU based on at least the AMBR for non-GBR traffic, and the priority indicated by the received configuration information; and
    send a response to the second WTRU, wherein the response indicates that the request has been rejected.

11. The first WTRU of claim 10, wherein the processor is configured to compare the priority indicated by the configuration information with respective priorities associated with one or more other connections between the first WTRU and one or more other WTRUs and determine whether to reject the request from the second WTRU based at least on the comparison.

12. The first WTRU of claim 10, wherein the processor is further configured to receive an authorization message from the network entity, wherein the authorization message indicates that the first WTRU is to act as a relay WTRU.

13. The first WTRU of claim 12, the configuration information is included in the authorization message.

14. The first WTRU of claim 10, wherein the processor is configured to determine to reject the request from the second WTRU based further on at least one of a QoS Class Identifier (QCI) or a 5G QoS indicator (5QI) associated with the radio link interface.

15. The first WTRU of claim 10, wherein based on the determination to reject the request from the second WTRU, the processor is configured to indicate a reason for the rejection in the response sent to the second WTRU.

16. The first WTRU of claim 15, wherein the reason indicates that the request has been rejected because of congestion at the first WTRU.

17. The first WTRU of claim 10, wherein the processor is further configured to determine to accept the request for the communication from the second WTRU, and to release another connection between the first WTRU and a third WTRU.

18. The first WTRU of claim 10, wherein the processor is further configured to, upon receiving the request from the second WTRU, send an inquiry to the network entity regarding the request.

* * * * *

UNITED STATES PATENT AND TRADEMARK OFFICE
CERTIFICATE OF CORRECTION

PATENT NO. : 11,665,730 B2
APPLICATION NO. : 16/475760
DATED : May 30, 2023
INVENTOR(S) : Saad Ahmad It is certified that error appears in the above-identified patent and that said Letters Patent is hereby corrected as shown below:

In the Claims

In Claim 10: Column 22, Lines 33, delete "for with the second" and insert -- for communicating with the second --.

Signed and Sealed this
Seventeenth Day of October, 2023

Katherine Kelly Vidal
*Director of the United States Patent and Trademark Office*